Figure 3:
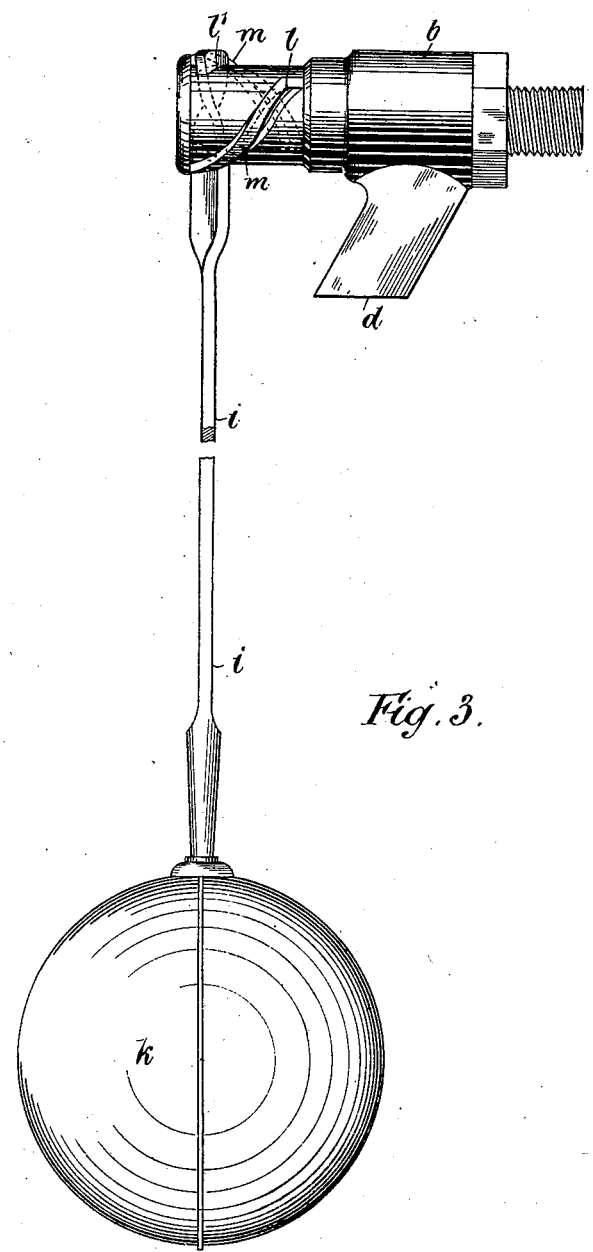

No. 668,652. Patented Feb. 26, 1901.
A. E. MARKWICK.
VALVE OR COCK OPERATED BY BALL FLOAT, &c.
(Application filed Dec. 18, 1899.)
(No Model.) 5 Sheets—Sheet 1.
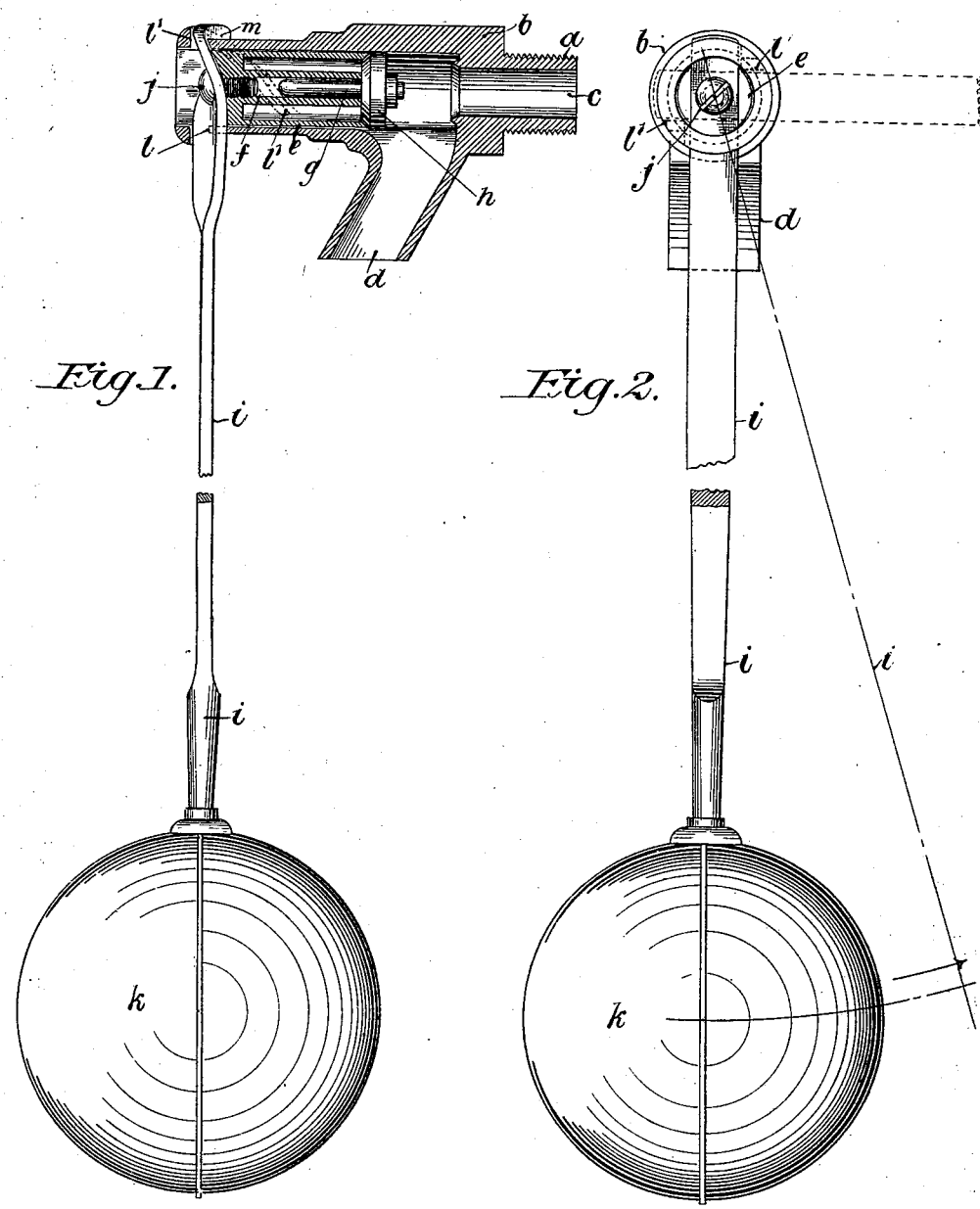
Witnesses.
Robt A Blake.
R A Smith.
Inventor.
Alfred Ernest Markwick,
by Henry H Leigh
Attorney.

No. 668,652. Patented Feb. 26, 1901.
A. E. MARKWICK.
VALVE OR COCK OPERATED BY BALL FLOAT, &c.
(Application filed Dec. 18, 1899.)
(No Model.) 5 Sheets—Sheet 3.
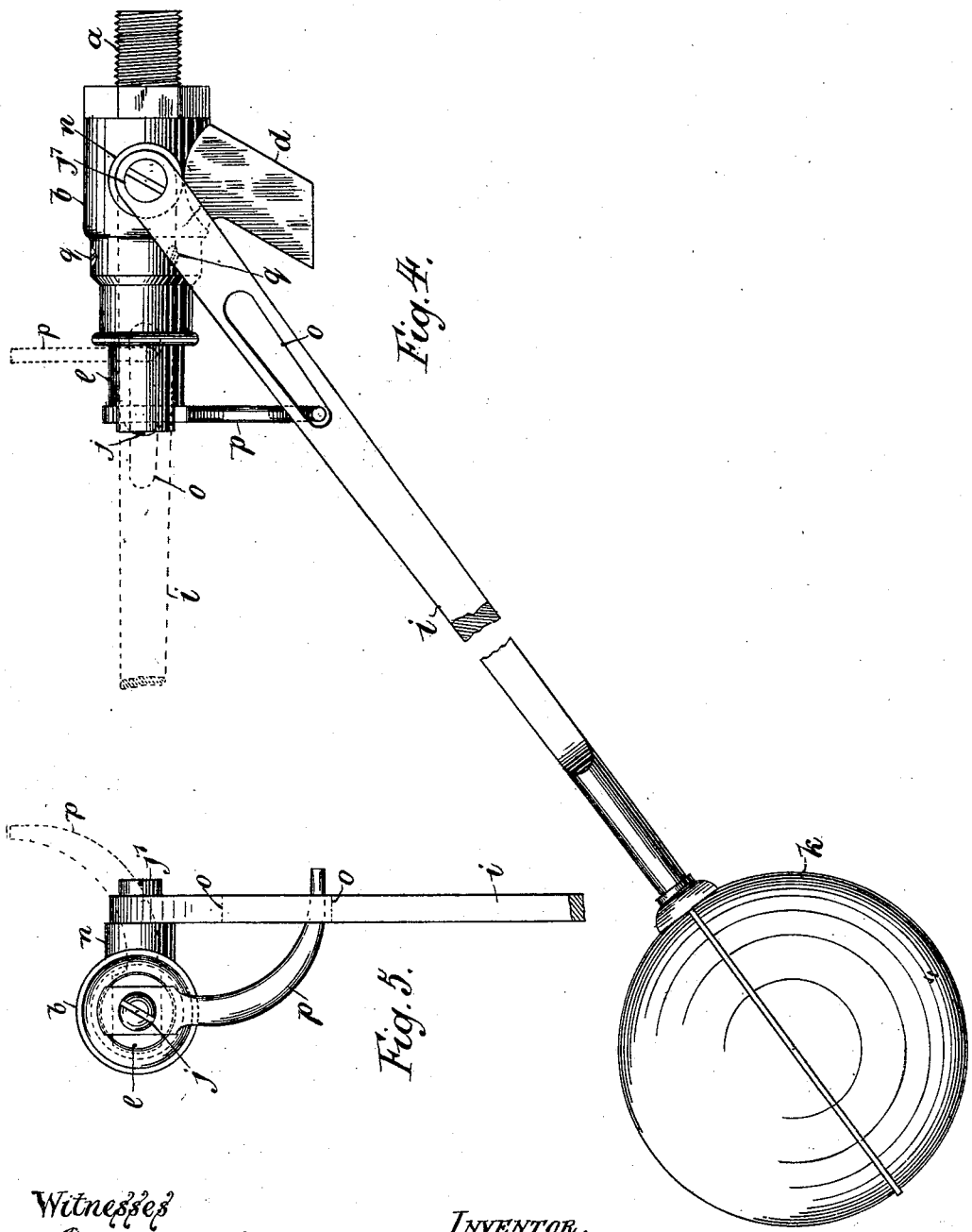
Witnesses
Robt. A. Blake.
R. A. Smith.
INVENTOR.
Alfred Ernest Markwick,
by Henry H. Leigh
Attorney.

No. 668,652.  
A. E. MARKWICK.  
VALVE OR COCK OPERATED BY BALL FLOAT, &c.  
(Application filed Dec. 18, 1899.)  
(No Model.)  
Patented Feb. 26, 1901.  
5 Sheets—Sheet 4.
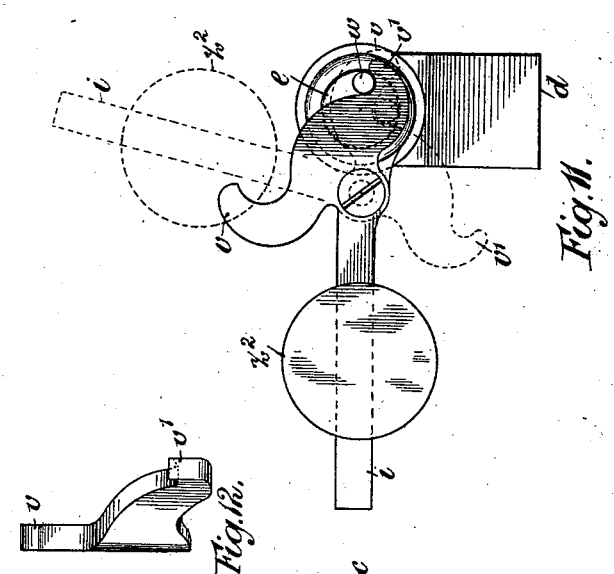
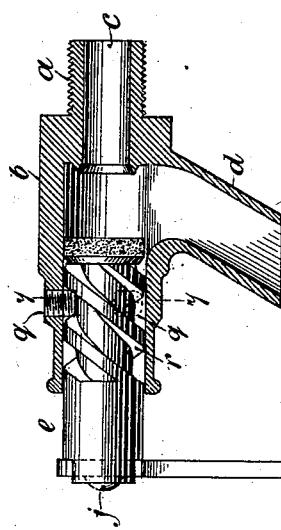
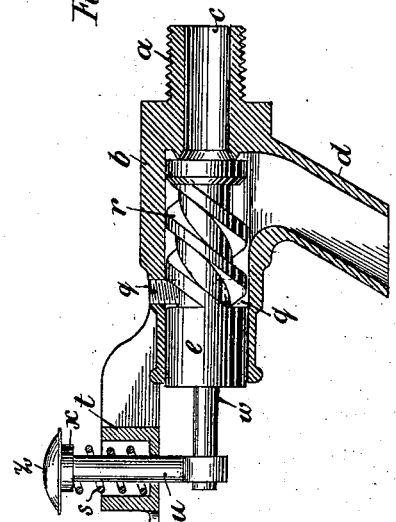
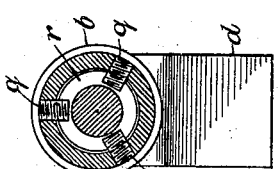
Witnesses.  
Robt. A. Blake.  
R. A. Smith.
Inventor.  
Alfred Ernest Markwick,  
by Henry H. Lerty  
Attorney.

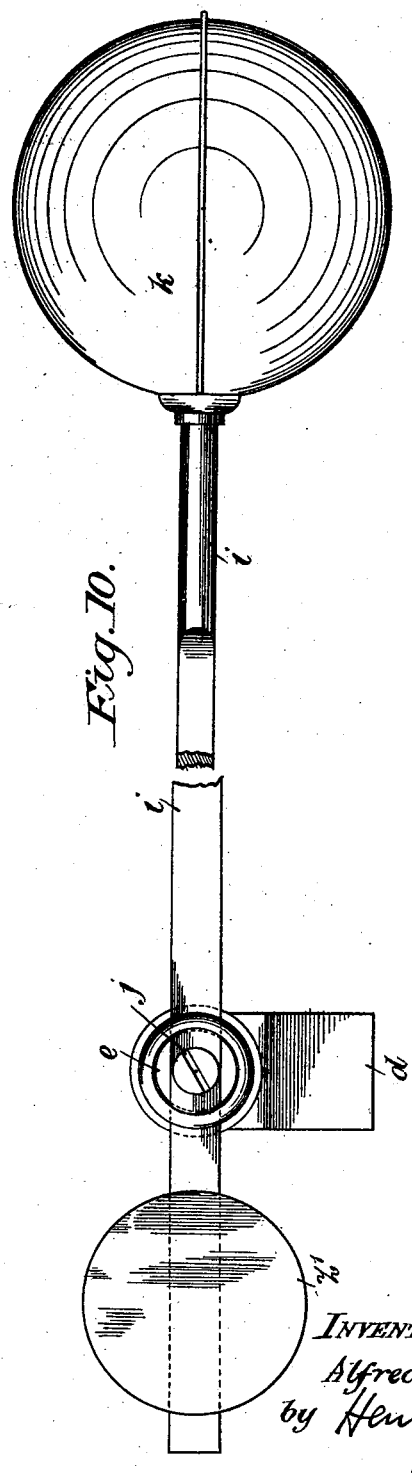

UNITED STATES PATENT OFFICE.

ALFRED ERNEST MARKWICK, OF KARACHI, INDIA.

VALVE OR COCK OPERATED BY BALL-FLOAT, &c.

SPECIFICATION forming part of Letters Patent No. 668,652, dated February 26, 1901.

Application filed December 18, 1899. Serial No. 740,847. (No model.)

*To all whom it may concern:*

Be it known that I, ALFRED ERNEST MARKWICK, M. I. M. E., of Karachi, in the Province of Sinde, in the Empire of India, have invented certain new and useful Improvements in Valves or Cocks Operated by Ball-Float or Otherwise; and I do hereby declare the following to be a full, clear, and exact description of the invention, such as will enable others skilled in the art to which it appertains to make and use the same.

This invention relates to improvements in valves or cocks operated by ball-float or otherwise, and the main objects in its design are simplicity of construction and small cost without decrease in efficiency for withstanding high pressures as compared with more complicated and costly valves or cocks.

I will now proceed to describe my invention in detail with the aid of the accompanying sheets of drawings, illustrating several modifications of it, in which—

Figure 1 is a longitudinal sectional elevation, the section being taken on a vertical plane passing through the middle of the valve-chamber, the float-rod, float, and valve being in elevation. Figs. 2 and 3 are front and side elevations, respectively, of Fig. 1. Fig. 4 is a side elevation of a modification wherein the float-lever works parallel to the valve-box. Fig. 5 is a front elevation of Fig. 4, the ball end of the float-lever being broken off for convenience of illustration. Fig. 6 is a longitudinal sectional elevation of a similar arrangement to that shown in Figs. 4 and 5, but constructed to operate with the ball-float lever at right angles to the valve-chamber. Fig. 7 is a section taken on the line 7 7 of Fig. 6. Figs. 8 and 9 illustrate, respectively in front and side sectional elevations, a further modification wherein the screw-threaded plunger or carrier is operated by pressure upon a spring-supported rod through the medium of a slot-and-pin crank-motion. Fig. 10 is a side elevation of valve and float-lever, the latter being prolonged beyond the point of junction with the valve and provided with a counterpoise. Fig. 11 illustrates in front elevation a still further modification in the method of operating the valve wherein the lever is shortened and horned at the end to engage in a pin or stud on the valve plunger or carrier; and Fig. 12 is a detached side elevation of the horned lever, showing that the two horns are not in the same plane.

My invention is what may be termed a "full-way" ball cock or valve, containing no obstruction in the way of valve-spindle, as in most equilibrium and like ball-cocks. The same action may be applied to self-closing cocks with the introduction of a weight or spring for closing.

As will be seen from the drawings, the invention consists, essentially, in a cock or valve more particularly suitable for the control of the passage of water through a pipe or other conduit in which the usual valve-spindle, threaded on the ball-float lever and having a soft plug in its end, which is pressed against and released from the inlet-orifice automatically by the action of the float-lever, is replaced by a sliding piston which carries the valve, the said piston being automatically or otherwise advanced to bring the valve up to the inlet-orifice to close the same and retracted to open it by means of two spirally-curved slots made in the valve-casing, near the nose thereof, in which slots works the valve end of the ball-float or other lever, which end is itself secured to the outer extremity of the said piston; or, instead of the curved slots with float-lever working therein, the piston may have one or more deep screw-threads formed on its exterior surface and the valve-casing be provided with one or more fixed pins projecting into the trough of the said threads to serve as its guide and fulcrum.

The remainder of the invention consists in several modifications in the method of and means for operating the piston both automatically by the usual float and by hand or by mechanical means.

Referring to Figs. 1, 2, and 3, these represent the valve or ball-cock complete when formed with curved slots in the casing and operating-lever working in the nose of the casing and at right angles to the cock. $a$ is the end of the valve, which is screwed into or connected to the service-pipe or source of supply. $b$ is the valve casing or shell. $c$ is the inlet-orifice, and $d$ is the outlet. $e$ is a piston, preferably, but not necessarily, hollow, to be strong with a minimum weight of material. It will be seen that the wearing-surfaces are large as compared with cocks of usual makes. This piston is plain on its exterior surface and fits slidably in the bore of the valve-shell $b$. It has a central deep cylindrical hole $f$, in which is lodged the spindle $g$ of the valve $h$, which latter may be of india-rubber, leather, or any other like or suitable material. The valve end of the float rod or lever $i$ is secured to the outward end of the piston $e$ by the screw $j$, and $k$ is the ball-float on the other end of the lever $i$. The valve end of the said lever $i$ works in the curved slots $l$ and $l'$. These slots lie in the trace of an imaginary helical thread or worm in the nose of the shell or casing $b$ of the valve—that is to say, these slots are of spiral form and cut in the casing, on opposite sides thereof, and the end of the lever $i$ passes through these slots from side to side of the casing, as shown, the said lever end being somewhat twisted to accommodate itself to the contour of the slots, down and up which it rides. $m$ is a rib or raised edge extending along the slots $l$ and $l'$, simply to furnish a broader bearing-surface for the rod $i$ against the edges of the said slots.

From the above description it will be seen that the lever $i$, actuated by the level of the water in the reservoir or tank through the medium of the ball-float $k$, works up or down, as the case may be, in a vertical plane at right angles to the valve or cock and simultaneously in a lateral direction, caused by the riding up or down the curved slots $l\,l'$, thus thrusting in or withdrawing the valve more or less against its seat at the inlet-orifice $c$. It will be seen clearly from Fig. 1 that the valve $h$ and its spindle $g$ when the valve is wide open or fully "on" leave a perfectly clear thoroughfare down for the water to pass from the inlet $c$ down the outlet-channel $d$, and, in fact, there is nothing whatever obstructing the entrance to this latter channel, which is one of the advantageous features of this invention. The horizontal dotted lines in Fig. 2 indicate the position of the operating-lever $i$ when the valve is fully closed, and the arrow of course indicates the direction in which the said lever moves. Should it be deemed necessary for the operating-lever $i$ to work in front of the valve, this could be done by shortening the said lever sufficiently to allow of a second lever to work on the end of it, with a long slot to accommodate it in its lateral and forward motions. This of course still retains a lever working in the nose of the cock, but not necessarily with the ball-float at the extreme end of it or even on it at all. This modification is not shown in the drawings.

In Figs. 4 and 5 the lever $i$ is secured by means of the screw $j'$ to a projection $n$ on the side of the valve-body and has a long slot $o$, in which rides a curved guide-pin $p$, secured to the outer end of the piston $e$. This piston may be either of the form or type shown in Figs. 1, 2, and 3 or as shown in Figs. 6 and 7, wherein the external surface of the piston has threads or a worm formed on it, which, acting in conjunction with three guide studs or pins $q$, causes the up-and-down motion of the float-lever to be transformed into the backward-and-forward one of the piston and valve. It will be understood at sight of these Figs. 4 and 5 that as the lever $i$ rises or is raised the bottom edge of the slot $o$ rubs against the under side of the curved guide-pin $p$, raising it, and thereby causing it to turn or rotate the piston, to which it is firmly attached by means of the screw $j$. The dotted lines in the figures in question indicate the positions of the moving parts when the lever $i$ is raised to its highest position.

In Figs. 6 and 7 the piston or carrier $e$ is provided with screw-threads constituting a worm $r$, and three pins or studs $q$, fixed in the shell $b$ of the cock, project inwardly far enough to nearly touch the bottom of the said threads, the said pins forming a guide and fulcrum for the worm $r$ to work against, so as to impart to the piston $e$ the desired forward-and-backward travel. In these Figs. 6 and 7 it will be noticed that the end of the float-lever is secured direct to the end of the piston or carrier $e$ and that the said lever works in a vertical plane at right angles to the cock or valve body. Thus the practical effect of the action of this modification is identical with that obtained by the modification illustrated in Figs. 1, 2, and 3, the threads $r$ on the piston $e$ corresponding to the helically-curved slots $l\,l'$ in the shell $b$ and the guide pins or studs $q$ corresponding to the guiding edges of the curved slots $l\,l'$.

In Figs. 8 and 9 the piston $e$ has a pin $w$ fixed in its outer end, the extremity of this pin $w$ projecting into a horizontal slot $y$, formed in the lower end of a vertical rod $u$, the upper end of which passes through a box $t$ and through the center of a helical spring $s$, contained in the said box. A collar $x$, integral with or fixed upon the upper part of the rod $u$, serves to confine the spring $s$ in a compressed condition between the said collar $x$ and the bottom of the box $t$, and thus always tending to keep the rod $u$ up, and consequently the valve closed. $z$ is a thumb button or knob on top of rod $u$ for convenience of pressing down the said rod by hand. It will be understood that downward pressure upon the rod $u$ causes the upper edge of the slot $y$ to press on the pin $w$, fixed in the end of the piston $e$, which latter being provided with the threads $r$ and the guide-pins $q$ and confined in the casing $b$ is thus forced to make a simultaneous rotary and backward movement, opening the valve.

In Fig. 10 is illustrated a special provision regarding the ball-float lever $i$, and it consists in the said lever $i$ being prolonged to any suitable distance beyond the point where it passes through or is connected to the cock and providing the said prolongation with a counterpoise $z'$, and the object of this is to render the cock an equilibrium one, so that the ball-float can exert its whole energy due to its buoyancy against the pressure of the water, less, of course, the amount of weight necessary to cause the float to drop as the water recedes. This counterpoised lever may be bent, if necessary, to suit circumstances.

In Fig. 11 the float-rod $i$ is shown provided with hooks or horns $v\,v'$ on its end projecting beyond the pivot-point. These horns as the lever moves up or down come in contact with a pin $w$ fixed in the outer end of the piston or plunger $e$, and so carry around with them the said piston, the screw-threads on the latter causing it to simultaneously move longitudinally in one direction or the other accordingly. The horned end of the lever in question is not flat or in one plane; but one of the horns is bent outward or laterally somewhat from the other to allow for the different positions of the pin $w$ due to its rotary travel in addition to its longitudinal displacement. This will be clearly understood from Fig. 12, wherein $v\,v'$ are the horns, and it can be seen at a glance that they are not both in the same plane. $z^2$ is a weight to accentuate the perfect closure of the cock.

I claim—

1. In a valve or cock, the combination with the valve-casing, of spirally-curved slots in the sides of the said casing and a lever passing through said slots at right angles to the casing and means for securing the lever to the valve, and means for securing the lever in position, as and for the purpose described and set forth.

2. In a valve or cock, the combination with the valve-casing, of spirally-curved slots in the sides of the said casing, a piston fitted slidably within said casing, and a lever secured direct to the outer end of said piston and passing transversely through said slots, as and for the purposes described and illustrated.

3. In a valve or cock, the combination with the valve-casing, of spirally-curved slots in the sides of the said casing a piston fitting slidably within said casing, a valve and spindle carried by the said piston, and a lever passing transversely through the slots and secured direct to the outer end of the piston, as and for the purpose described and illustrated.

In witness whereof I have hereunto set my hand this 20th day of April, 1899.

ALFRED ERNEST MARKWICK.

Witnesses:
P. DUNCAN,
J. MOORE.